US012027355B2

(12) United States Patent
Cooks et al.

(10) Patent No.: US 12,027,355 B2
(45) **Date of Patent: *Jul. 2, 2024**

(54) SYSTEMS AND METHODS FOR PERFORMING MULTIPLE PRECURSER, NEUTRAL LOSS AND PRODUCT ION SCANS IN A SINGLE ION TRAP

(71) Applicant: Purdue Research Foundation, West Lafayette, IN (US)

(72) Inventors: Robert Graham Cooks, West Lafayette, IN (US); Dalton Snyder, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,212

(22) Filed: May 2, 2023

(65) Prior Publication Data

US 2023/0298874 A1 Sep. 21, 2023

Related U.S. Application Data

(63) Continuation of application No. 17/159,407, filed on Jan. 27, 2021, now Pat. No. 11,676,805, which is a (Continued)

(51) Int. Cl.
*H01J 49/00* (2006.01)

(52) U.S. Cl.
CPC ........ *H01J 49/0027* (2013.01); *H01J 49/004* (2013.01); *H01J 49/0081* (2013.01); *H01J 49/0013* (2013.01)

(58) Field of Classification Search
CPC .. H01J 49/0027; H01J 49/004; H01J 49/0081; H01J 49/0013
See application file for complete search history.

(56) References Cited

U.S. PATENT DOCUMENTS 5,644,131 A * 7/1997 Hansen ................ H01J 49/424 313/256
6,177,668 B1 * 1/2001 Hager ................ H01J 49/4225 250/281

(Continued)

FOREIGN PATENT DOCUMENTS

WO 2009/023361 A2 2/2009
WO 2009/102766 A1 8/2009

OTHER PUBLICATIONS

Bonner, 1977, The Cylindrical Ion Trap, International Journal of Mass Spectrometry and Ion Physics, 24(3):255-269.

(Continued)

*Primary Examiner* — David A Vanore
(74) *Attorney, Agent, or Firm* — Brown Rudnick LLP; Adam M. Schoen

(57) ABSTRACT

The invention generally relates to systems and methods for performing multiple precursor, neutral loss and product ion scans in a single ion trap. In certain aspects, the invention provides systems including a mass spectrometer having a single ion trap, and a central processing unit (CPU), and storage coupled to the CPU for storing instructions that when executed by the CPU cause the system to apply at least one of the following ion scans to a single ion population in the single ion trap: multiple precursor ion scans, a plurality of segmented neutral loss scans, or multiple simultaneous neutral loss scans.

20 Claims, 16 Drawing Sheets

Related U.S. Application Data continuation of application No. 16/047,267, filed on Jul. 27, 2018, now Pat. No. 10,937,638.

(60) Provisional application No. 62/537,676, filed on Jul. 27, 2017.

(56) References Cited

U.S. PATENT DOCUMENTS

| | | | | |
|---|---|---|---|---|
| 6,838,666 | B2 * | 1/2005 | Ouyang | H01J 49/422 250/282 |
| 7,335,897 | B2 * | 2/2008 | Takats | H01J 49/142 250/288 |
| 8,304,718 | B2 * | 11/2012 | Ouyang | H01J 49/0422 250/281 |
| 10,937,638 | B2 * | 3/2021 | Cooks | H01J 49/004 |
| 11,676,805 | B2 * | 6/2023 | Cooks | H01J 49/0027 250/283 |
| 2007/0264246 | A1 * | 11/2007 | Gross | A61P 9/12 514/4.8 |
| 2011/0121172 | A1 * | 5/2011 | Savitski | H01J 49/0045 250/288 |
| 2012/0119079 | A1 * | 5/2012 | Ouyang | H01J 49/16 250/288 |
| 2014/0224981 | A1 * | 8/2014 | Owen | H01J 49/4225 250/288 |

OTHER PUBLICATIONS

Carroll, 1975, Atmospheric Pressure Ionization Mass Spectrometry: Corona Discharge Ion Source for Use in Liquid Chromatograph-Mass Spectrometer-Computer Analytical System, Anal. Chem., 47:2369-2373.

Cody, 2005, Versatile New Ion Source for the Analysis of Materials in Open Air under Ambient Condition, Anal. Chem. 77:2297-2302.

Fenn, 1989, Electrospray Ionization for Mass Spectrometry of Large Biomolecules, Science 246:64-71.

Gadgil, 2007, Screening and Sequencing of Glycated Proteins by Neutral Loss Scan LC/MS/MS Method, Analytical Chemistry, 79(15):5991-5999.

Gao, 2006, Handheld Rectilinear Ion Trap Mass Spectrometer, Anal Chem 78(17):5994-6002.

Gao, 2008, Design and Characterization of a Multisource Hand-Held Tandem Mass Spectometer, Anal. Chem., 80:7198-7205.

Hagar, 2002, A new linear ion trap mass spectromer, Rapid Communi. Mass Spectrometry, 16(6):512-526.

Hendricks, 2014, Autonomous in-situ analysis and real-time chemical detection using a backpack miniature mass spectrometer: concept, instrumentation development and performance, Anal. Chem., 86:2900-2908.

Hou, 2011, Sampling Wand for an Ion Trap Mass Spectrometer, Anal. Chem., 83:1857-1861.

Kogelschatz, 2003, Dielectric-barrier Discharges: Their History, Discharge Physics, and Industrial Applications, Plasma Chem. and Plasma Processing, 23:1-46.

Laiko, 2000, Atmospheric Pressure Matrix-Assisted Laser Desoprtion/Ionization Mass Spectrometry, Analytical Chemistry, 72:652-657.

Li, 2014, Miniature Ambient Mass Analysis System, Anal. Chem., 86:2909-2916.

Schwudke, 2005, Lipid Profiling by Multiple Precursor and Neutral Loss Scanning Driven by the Data-Dependent Acquisition, Analytical Chemistry, 78(2):585-595.

Shiea, 2005, Electrospray-assisted laser desorption/ionization mass spectrometry for direct ambient analysis of solids, J. Rapid Comm in Mass Spectrometry, 19:3701-3704.

Snyder, 2016, Calibration procedure for secular frequency scanning in ion trap mass spectrometers, Rapid Commun. Mass Spectrom., 30:1190-1196.

Snyder, 2016, Linear mass scans in quadrupole ion traps using the inverse Mathieu q scan, Rapid Commun. Mass Spectrom., 30:2369-2378.

Snyder, 2017, Single Analyzer Neutral Loss Scans in a Linear Quadrupole Ion Trap Using Orthogonal Double Resonance Excitation, Anal. Chem. 89:8148-8155.

Snyder, 2017, Single Analyzer Precursor Ion Scans in a Linear Quadrupole Ion trap Using Orthogonal Double Resonance Excitation, J. Am. Soc. Mass Spectrom., 28:1929-1938.

Snyder, 2018, Precursor and Neutral Loss Scans in an RF Scanning Linear Quadrupole Ion Trap, J. Am. Soc. Mass Spectrom., 29:1345-1354.

Sokol, 2011, Miniature mass spectrometer equipped with electrospray and desorption electrospray inonization for direct analysis of organics from solids and solutions, Int. J. Mass Spectrom., 306:187-195.

Stahlman, 2009, High-throughput shotgun lipidomics by quadrupole time-of-flight mass spectrometry, Journal of Chromatography B, 877(26):2664-2672.

Takats, 2004, Mass Spectrometry Sampling Under Ambient Conditions with Desoprtion Electrospray Ionization, Science 306:471-473.

Tanaka, 1988, Protein and polymer analyses up to m/z 100 000 by laser ionization time-of-flight mass spectrometry, Rapid Commun. Mass Spectrom., 2:151-153.

Yamashita, 1984, Electrospray Ion Source. Another Variation on the Free-Jet Theme, J. Phys. Chem., 88:4451-4459.

* cited by examiner

SYSTEMS AND METHODS FOR PERFORMING MULTIPLE PRECURSER, NEUTRAL LOSS AND PRODUCT ION SCANS IN A SINGLE ION TRAP

RELATED APPLICATION

The present application is a continuation of U.S. nonprovisional application Ser. No. 17/159,407, filed Jan. 27, 2021, which is a continuation of U.S. nonprovisional application Ser. No. 16/047,267, filed Jul. 27, 2018, which claims the benefit of and priority to U.S. provisional application Ser. No. 62/537,676, filed Jul. 27, 2017, the content of each of which is incorporated by reference herein in its entirety.

GOVERNMENT INTEREST

This invention was made with government support under NNX16AJ25G awarded by the National Aeronautics and Space Administration (NASA). The government has certain rights in the invention.

FIELD OF THE INVENTION

The invention generally relates to systems and methods for performing multiple precursor, neutral loss and product ion scans in a single ion trap.

BACKGROUND

The drive to miniaturize mass spectrometers has encouraged a wealth of unconventional methods of ionization, atmospheric pressure interfaces, vacuum systems, and mass analyzer combinations. Both continuous and discontinuous atmospheric pressure interfaces have been developed, allowing the coupling of ambient spray and plasma ionization methods with portable systems. The standard analyzer geometry has evolved from the 3D quadrupole ion trap (Paul trap), to cylindrical, rectilinear, linear, toroidal, and halo traps, as well as ion trap arrays, two-plate linear ion traps, wire ion traps, and other unusual devices.

However, the fundamental way in which mass analysis is performed in quadrupole ion traps has varied very little. This is surprising, especially given the clear constraints in terms of size, power, and complexity of miniature ion trap systems. Three unconventional mass scanning methodologies have appeared in the ion trap literature: digital ion trap frequency scanning, sinusoidal RF frequency scanning, and ac frequency scanning. Although digital technology is promising, especially with regards to high spectral resolution and scan speed, it requires a complete overhaul of existing instrumentation, and the power consumption of the technique is higher than for conventional methods. RF frequency scanning can similarly improve resolution and mass range but it can also reduce power consumption and hence instrument size.

AC frequency scanning techniques exist, but such methods are not particularly high performance. However, AC frequency scanning techniques offer increased instrument versatility while requiring virtually no instrument modifications. Among the unique capabilities made accessible by AC frequency scanning (also known as secular frequency scanning) are single analyzer precursor ion scans and neutral loss scans. These simple scans require simultaneous orthogonal excitation of precursor and product ions for fragmentation of a particular precursor ion in concert with the ejection and detection of a particular product ion. In the case of the precursor ion scan, the product ion m/z, and hence secular frequency under constant RF conditions, is fixed, whereas in the neutral loss scan the difference between precursor ion and product ion m/z is fixed, and with an added noise elimination scan, this requires a triple frequency scan.

SUMMARY

The invention recognizes that both the precursor ion scan and the neutral loss scan suffer from low conversion of precursor ions to detected product ions using conventional scan rates (thousands of Dalton/charge per second). For example, in cases where each precursor ion is given ~3 ms to fragment, typical estimated conversions are 5-10%, which implies that perhaps 90% of the precursor ions are left in the ion trap after a precursor ion scan. For the neutral loss scan, this is not the case because the precursor ions must be cleared from the ion trap during the scan to prevent artifact peaks.

The invention takes advantage of the inefficiency in fragmentation in the precursor scan, and utilizes that inefficiency in order to conduct multiple precursor ion scans on the same single ion population. That allows certain MS/MS permutations to be performed on a single ion population in a single ion trap. By performing multiple scans on the same ion population, the information obtained from those ions can be maximized, a particularly useful characteristic for resource-constrained ion traps with relatively low duty cycles and when sample size and/or access is highly limited. Exemplary combinations are multiple precursor ion scans, precursor ion scans followed by a neutral loss scan, precursor ion scans followed by product ion scans, and segmented neutral loss scans (i.e., different mass ranges being interrogated by different (or the same) neutral loss scans, which can be done at the same or different RF amplitudes), as well as simultaneous precursor and neutral loss scans.

In certain aspects, the invention provides systems including a mass spectrometer having a single ion trap, and a central processing unit (CPU), and storage coupled to the CPU for storing instructions that when executed by the CPU cause the system to apply at least one of the following ion scans to a single ion population in the single ion trap: multiple precursor ion scans, a plurality of segmented neutral loss scans, or multiple simultaneous neutral loss scans.

In other aspects, the invention provides methods for analyzing a single ion population that involve generating a single ion population that is transferred into a single ion trap of a mass spectrometer, and applying, via a CPU operably associated with the mass spectrometer, at least one of the following ion scans to the single ion population in the single ion trap: multiple precursor ion scans, a plurality of segmented neutral loss scans, or multiple simultaneous neutral loss scans.

In certain embodiments, the multiple precursor ion scans are applied sequentially to the single ion population. In other embodiments, the multiple precursor ion scans are applied simultaneously to the single ion population. In certain embodiments in which the ion scans are multiple precursor ion scans, the CPU causes the system to apply at least one additional scan to the single ion trap. The at least one additional scan may be a neutral loss scan. In such embodiments, the CPU may cause the system to apply the neutral loss scan simultaneously or sequentially with the multiple precursor ion scans. In other embodiments, the at least one additional scan is one or more product ion scans, applied after the precursor ion scans. In other embodiments, the at least one additional scan is a plurality of segmented neutral loss scans.

The mass spectrometer may be any type of mass spectrometer, such as a bench-top or miniature (portable) mass spectrometer. In certain embodiments, the mass spectrometer is a miniature mass spectrometer. In certain embodiments, the system further includes an ionization source, which may be any ionization source known in the art.

The single ion population may be generated from any type of sample. Exemplary samples include biological samples (e.g., human tissue or body fluids, such as oral fluids), agricultural samples, industrial samples, environmental samples, or combinations thereof.

In other aspects, systems and methods of the invention can be applied to multiple reaction monitoring (MRM). MRM may be performed in which multiple precursor scans are applied to a single ion population in a single ion trap under conditions in which the experiment is performed in a frequency (mass) range in which other ions do not occur and that subsequent experiments would then be possible.

In other aspects, the invention provides methods for analyzing a sample that involve generating a single ion population from a sample that is transferred into a single ion trap of a mass spectrometer; and applying, via a CPU operably associated with the mass spectrometer, at least one of the following ion scans to the single ion population in the single ion trap: multiple precursor ion scans, a plurality of segmented neutral loss scans, or multiple simultaneous neutral loss scans, thereby analyzing the sample. Exemplary samples include biological samples, agricultural samples, industrial samples, environmental samples, or combinations thereof.

BRIEF DESCRIPTION OF THE DRAWINGS

(FIG. 1A) full AC scan mass spectrum of 3,4-methylenedioxyamphetamine (mda), 3,4-methylenedioxymethamphetamine (mdma), 3,4-methylenedioxyethylamphetamine, and cocaine, and (FIG. 1B) precursor ion scan of m/z 163 followed by precursor ion scan of m/z 182 using the same ion population.

(FIG. 2A) full AC scan mass spectrum of cocaine, noroxycodone, and oxycodone, and (FIG. 2B) precursor ion scan of m/z 182 followed by neutral loss scan of 18 Da.

(FIG. 3A) full RF scan mass spectrum of buphedrone, N-ethylcathinone, and methamphetamine, and (FIG. 3B) precursor ion scan of m/z 160 followed by product ion scan of isobars at m/z 178, confirming that both buphedrone and N-ethylcathinone are present.

(FIG. 4A) full RF ramp resonance ejection mass spectrum of methamphetamine (map), 3,4-methylenedioxymethamphetamine (mdma), noroxycodone, and oxycodone, and (FIG. 4B) segmented neutral loss of 18 Da (at a LMCO of 88 Da) and subsequently 18 Da (at a LMCO of 166 Da) using a single ion injection. No signal was observed with the precursor ion excitation signal off.

(FIG. 5A) full ac frequency scan of protonated methamphetamine, 3,4-methylenedioxymethamphetamine, and 3,4-methylenedioxyethylamphetamine, (FIG. 5B) simultaneous double precursor ion scan of m/z 119 and m/z 163, (FIG. 5C) single neutral loss scan of 85 Da of a mixture of morphine, codeine, and 6-monoacetylmorphine, (FIG. 5D) simultaneous precursor ion scan of m/z 286 and neutral loss scan of 85 Da, (FIG. 5E) separate neutral loss scans of 17 Da (blue) and 31 Da (red) performed on amphetamine, methamphetamine, 3,4-methylenedioxyamphetamine, and 3,4-methylenedioxymethamphetamine, and (FIG. 5F) simultaneous neutral loss scan of 17 Da and 31 Da performed on the four amphetamines.

(FIG. 6A) full scan of 10% oral fluid with final concentration 100 ppb amp, map, mda, and mdma (1 ppm in oral fluid), (FIG. 6B) simultaneous double precursor ion scan of m/z 119 and 163, and (FIG. 6C) the same experiment at 1 ppm final concentration of amphetamines.

DETAILED DESCRIPTION

Figure 1A:
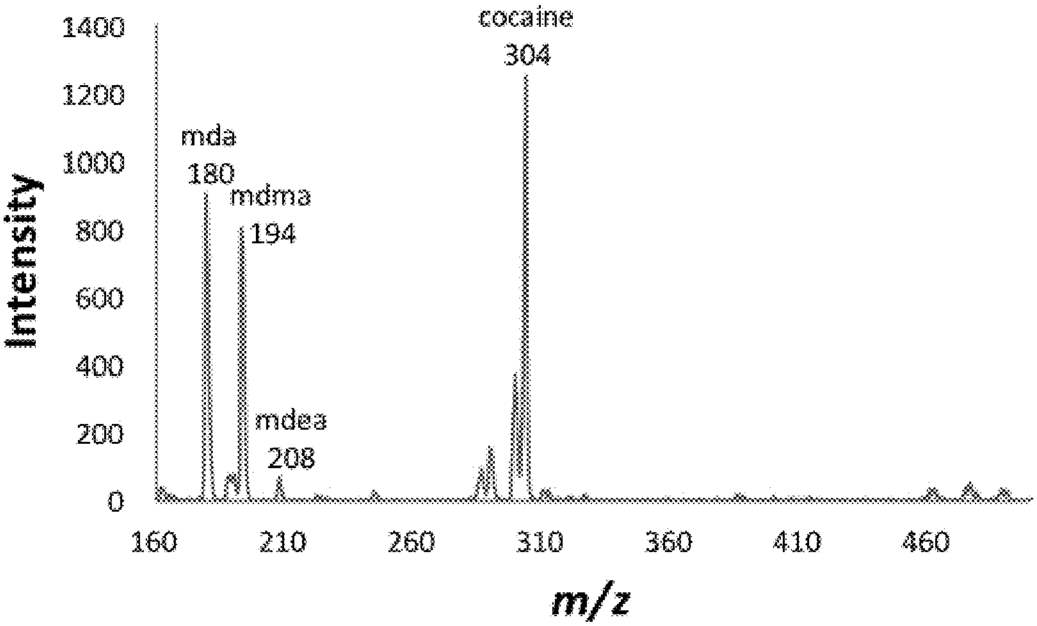
FIGS. 1A-B show permutations of precursor ion scans.

The invention generally relates to systems and methods for performing for performing multiple precursor, neutral loss and product ion scans in a single ion trap. Methods of performing precursor ion scans as well as neutral loss scans in a single linear quadrupole ion trap have recently been described and demonstrated. The invention generally relates to methodology for performing permutations of MS/MS scan modes, that is, ordered combinations of precursor, product, and neutral loss scans, following a single ion injection event. Exemplary permutations include 1) multiple precursor ion scans, 2) precursor ion scans followed by a single neutral loss scan, 3) precursor ion scans followed by product ion scans, and 4) segmented neutral loss scans. In addition, the common product ion scan can be performed earlier in the sequence under certain conditions. Multiple precursor ion scans can be performed simultaneously as can precursor ion scans with a neutral loss scan.

The systems and methods can be used to analyze any type of sample or chemical, as described in more detail here. Certain exemplary compounds were used to illustrate the systems and methods of the invention. For such exemplary demonstrations, amphetamine, methamphetamine, 3,4-methylenedioxyamphetamine, 3,4-methylenedioxymethamphetamine, 3,4-methylenedioxyethylamphetamine, cocaine, noroxycodone, oxycodone, buphedrone HCl, and N-ethylcathinone were purchased from Cerilliant (Round Rock, TX, USA). HPLC grade methanol was purchased from Fisher Scientific (Hampton, NH, USA). Oral fluid samples were spiked with amphetamine standards and subsequently diluted ten-fold in 95:4.9:0.1 acetonitrile:water:formic acid.

The skilled artisan will appreciate that any ionization source and technique can be used with the systems and methods of the invention, as described in more detail herein. In exemplary embodiments, nanoelectrospray ionization using a 1.5 kV potential was utilized. Borosilicate glass capillaries (1.5 mm O.D., 0.86 mm I.D.) from Sutter Instrument Co. (Novato, CA, USA) were pulled to 2 μm tip diameters using a Flaming/Brown micropipette puller (model P-97, Sutter Instrument Co.). The nanospray electrode holder (glass size 1.5 mm) was purchased from Warner Instruments (Hamden, CT, USA) and was fitted with 0.127 mm diameter silver wire, part number 00303 (Alfa Aesar, Ward Hill, MA).

All scans were performed using a Finnigan LTQ linear ion trap mass spectrometer (San Jose, CA, USA) modified previously to perform orthogonal excitation (Snyder et al., J. Am. Soc. Mass Spectrom. 10.1007/s13361-017-1707-y; and Snyder et al., Anal. Chem. 2017, the content of each of which is incorporated by reference herein in its entirety). The ion trap has dimensions $x_0$=4.75 mm, $y_0$=4 mm, and three axial sections of lengths 12, 37, and 12 mm. The RF frequency was tuned to 1.166 MHz. The RF amplitude was held constant throughout ionization, ion cooling, and mass scan segments by substituting the RF modulation signal between the RF detector board and RF amplifier with a low voltage DC pulse from an external function generator. All AC waveforms were generated by using two Keysight 33612A (Chicago, IL, USA) arbitrary waveform generators. Inverse Mathieu q scans were generated in Matlab (Snyder et al., Rapid Commun. Mass Spectrom. 2016, 30, 2369-2378, the content of which is incorporated by reference herein in its entirety) exported as .csv files, and imported to the waveform generators.

Precursor ion scans were performed by applying to the y electrodes of the linear ion trap a low voltage (~200 $mV_{pp}$) swept frequency to generate an inverse Mathieu q scan for precursor ion excitation while simultaneously applying a higher voltage (~600 $mV_{pp}$) fixed frequency to the x electrodes at a particular product ion's secular frequency.

Similarly, neutral loss scans required three identical inverse Mathieu q scans with appropriate trigger delays. Trigger delays are described for example in Snyder et al. (Anal. Chem. 2017), the content of which is incorporated by reference herein in its entirety. A first frequency scan (~200 $mV_{pp}$) was used for precursor ion excitation, a second frequency scan (~600 $mV_{pp}$) with trigger delay was applied to reject remaining precursor ions subsequent to their excitation, and finally a third frequency sweep (~600 $mV_{pp}$) with a trigger delay larger than the artifact delay was used for product ion ejection. The fixed neutral loss selected was directly proportional to the time delay between the excitation and ejection sweeps. Scan rates for precursor ion scans as well as product ion scans ranged from 200 Da/s to 800 Da/s. Each scan was calibrated separately using a linear fit of m/z vs. time.

Permutation scans were performed by applying the appropriate waveforms back-to-back (or simultaneously in the case of multiple precursor and precursor plus neutral loss scans). Only one ion injection was used for each permutation and automatic gain control was turned off. Injection time was varied from 5 ms to 25 ms, depending on sample concentration (generally 1-10 ppm, viz. g/L). Each mass spectrum shown here is the average of 10 scans.

Precursor ion scans and neutral loss scans are possible in single quadrupole ion traps using double resonance excitation, that is, by simultaneously exciting a precursor ion and ejecting a particular product ion so that the detection of that product ion occurs during the unique time during which its precursor fragments. Unlike CID in beam-type instruments (e.g. sectors and triple quadrupoles), CID in ion traps requires a relatively long time to increase internal energies because 1) helium is used as the collision partner and 2) collision energies are quite small. Hence many collisions, and thus more time, are required for fragmentation in ion traps. For the precursor scans and neutral loss scans, the low fragmentation efficiency translates into relatively low sensitivity for conventional scan rates. However, precursor ion scans, if performed under low AC amplitude conditions, do not clear the ion trap and thus if only 10% of the precursor ions are converted to product ions, then the other 90% of the ions are left in the trap for reexamination. This characteristic makes available permutations of MS/MS scan modes.

Exemplary MS/MS permutations is shown in Table 1.

TABLE 1

MS/MS permutations available to the linear ion trap [a,b]

Figure 1B:
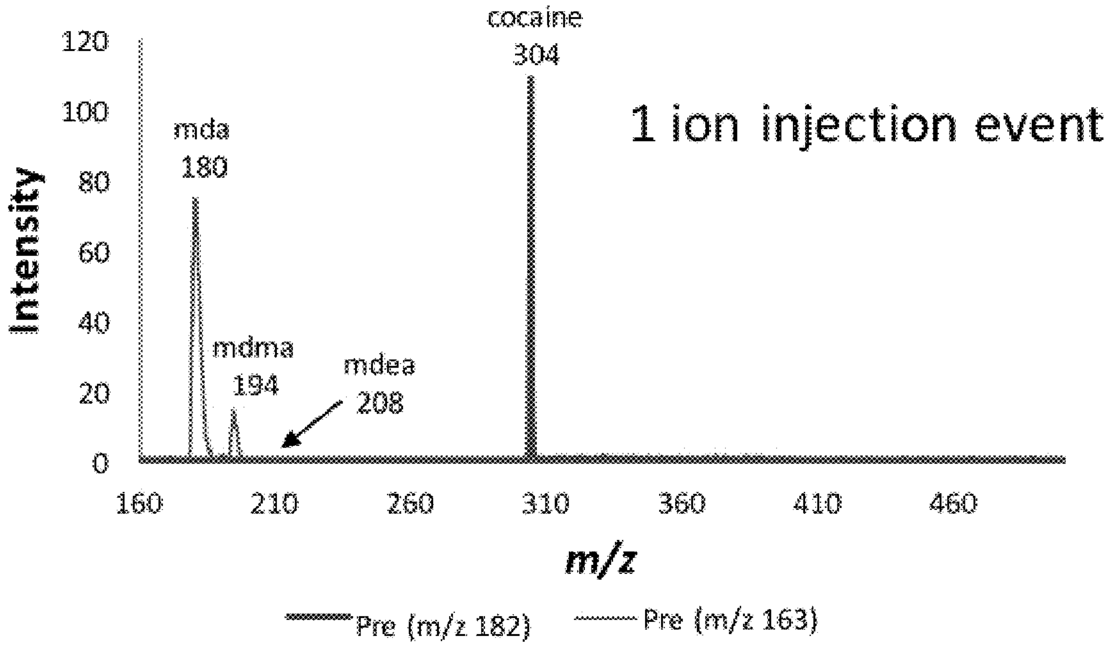
Figure 2A:
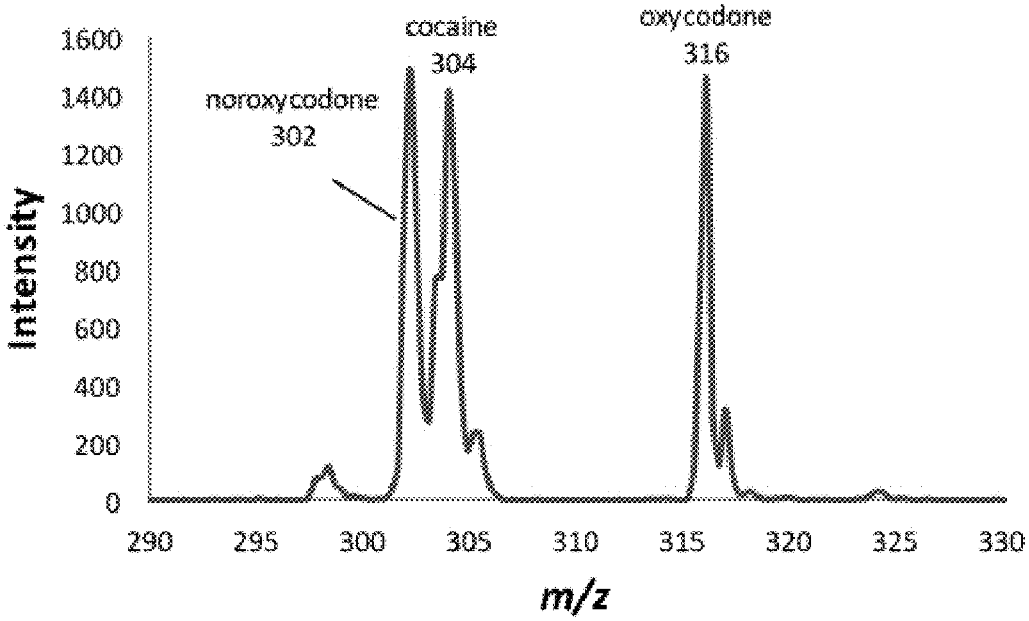
FIGS. 2A-B show permutations of precursor ion scans and neutral loss scans.
Figure 2B:
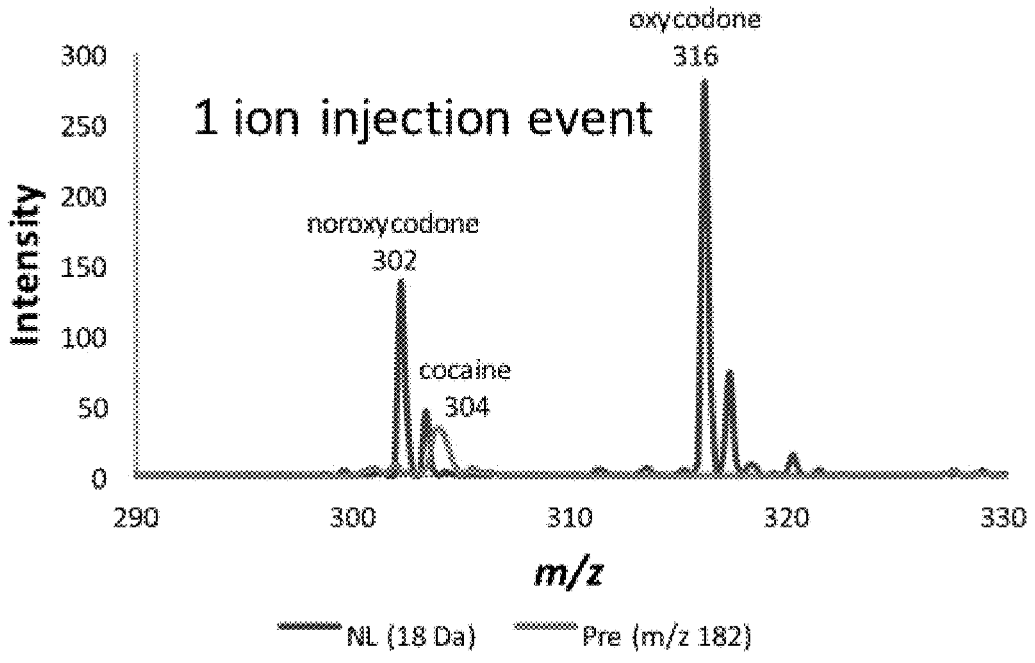
Figure 3A:
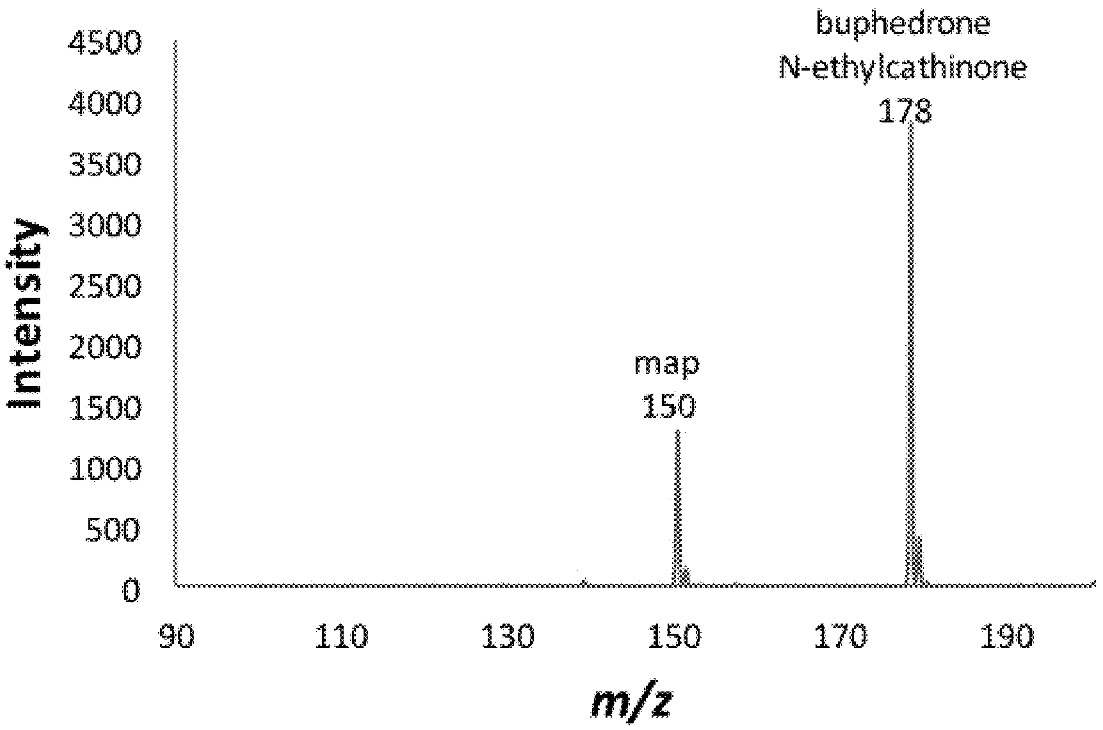
FIGS. 3A-B show permutations of precursor ion scan and product ion scan.
Figure 3B:
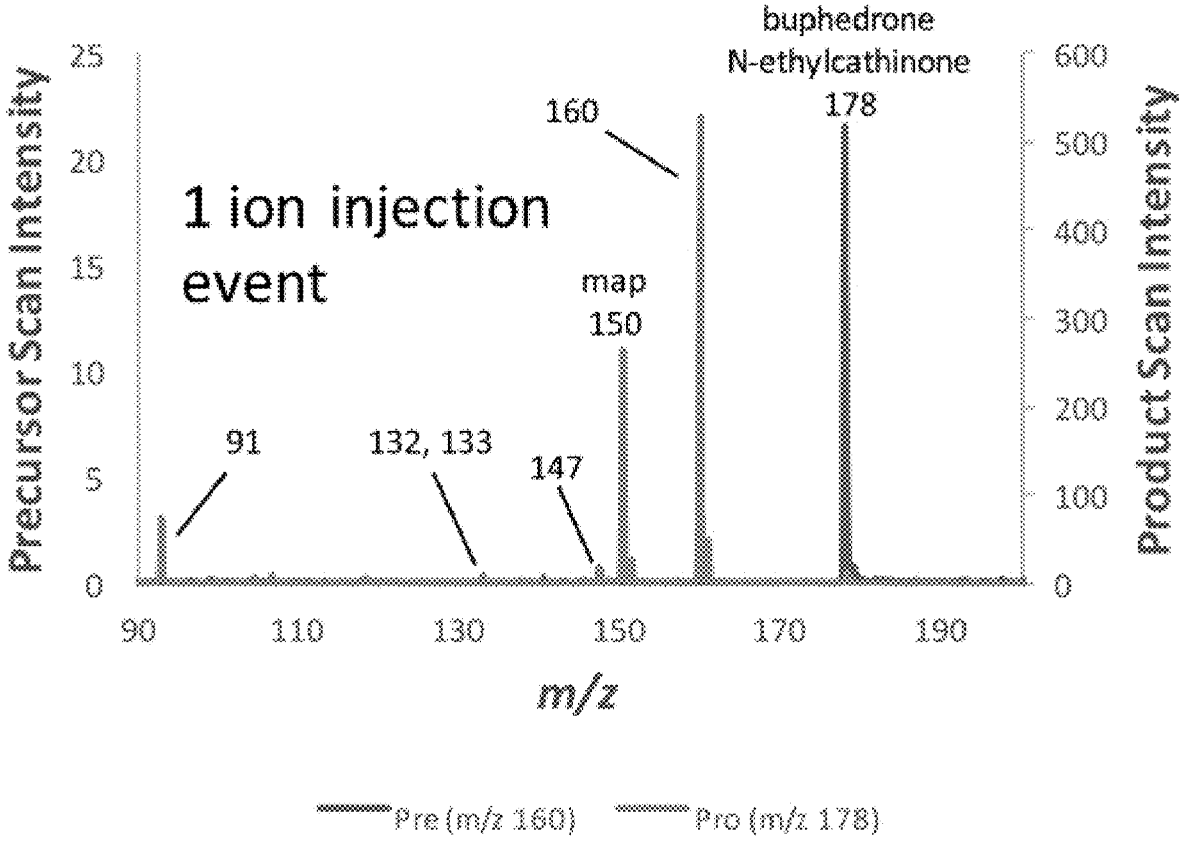
Figure 4A:
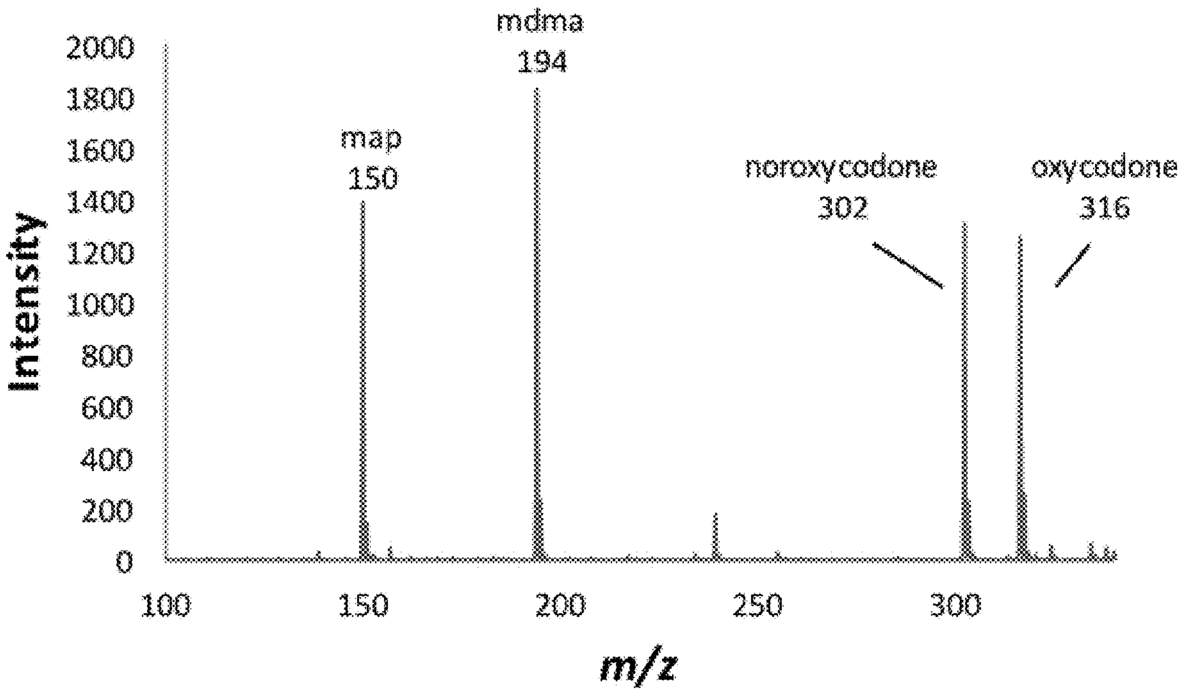
FIGS. 4A-B show the segmented neutral loss scan.
Figure 4B:
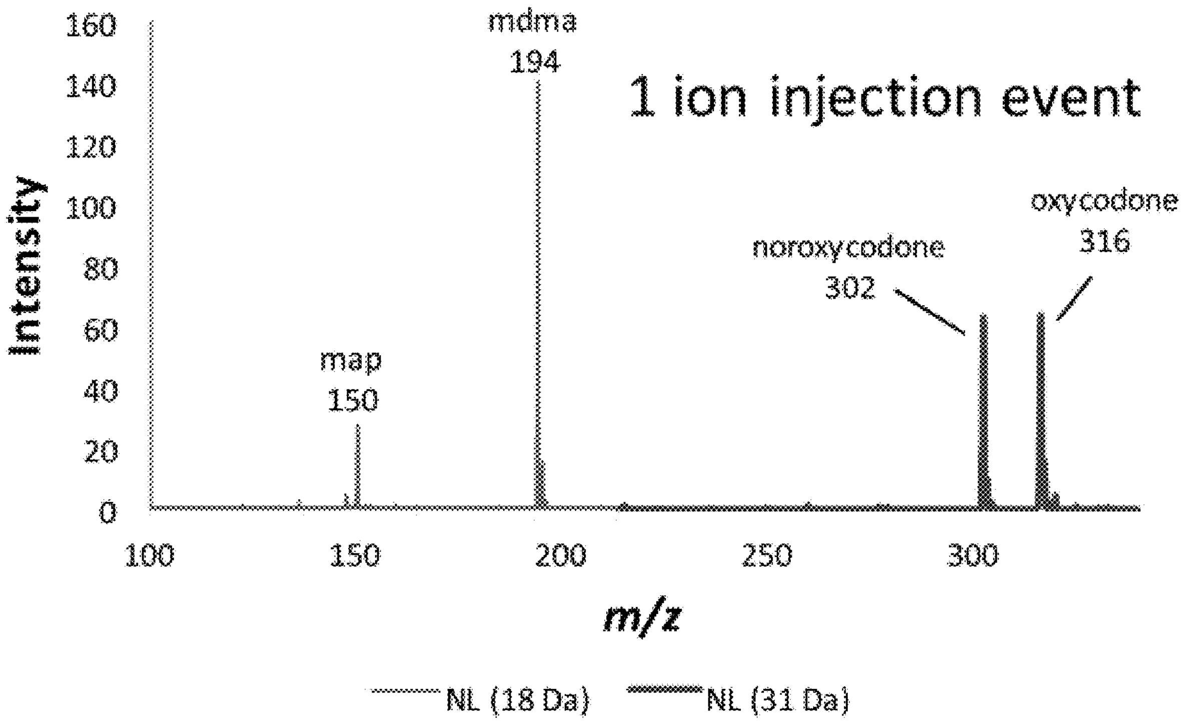
Figure 5A:
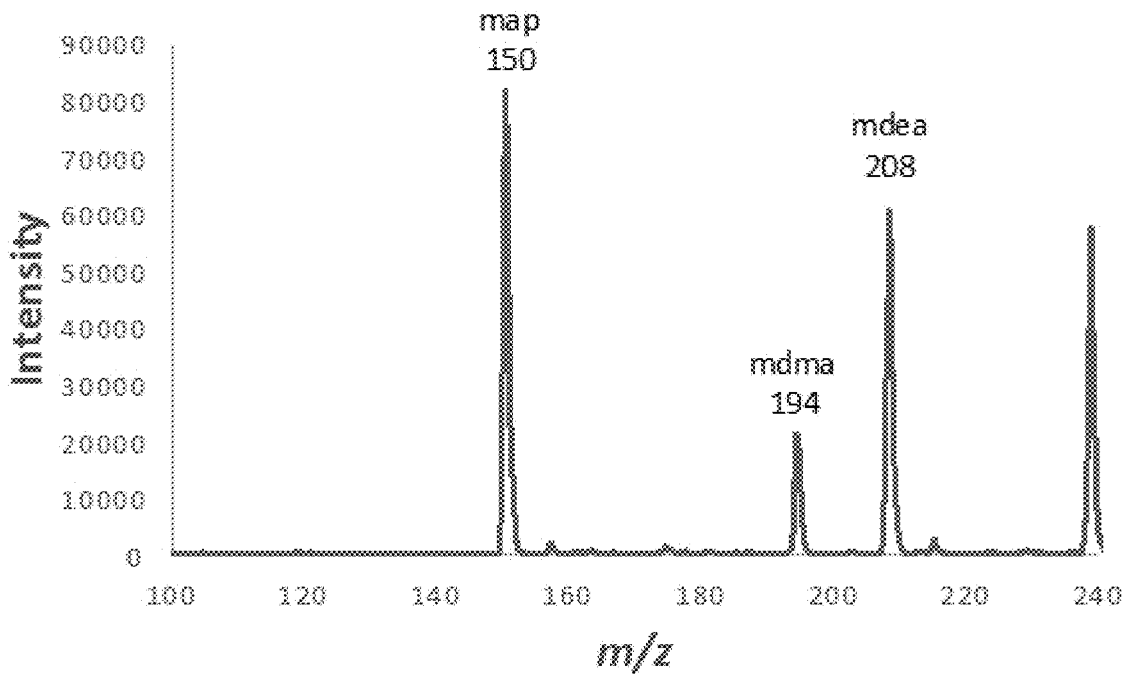
FIGS. 5A-F show simultaneous MS/MS scans.
Figure 5B:
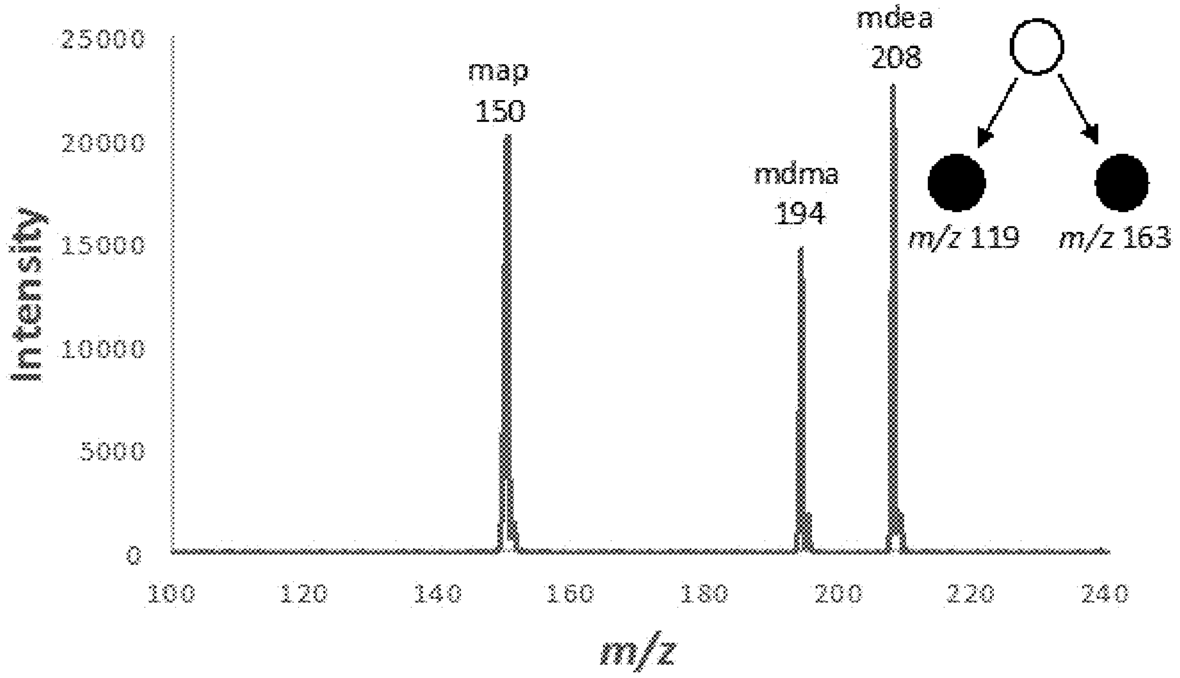
Figure 5C:
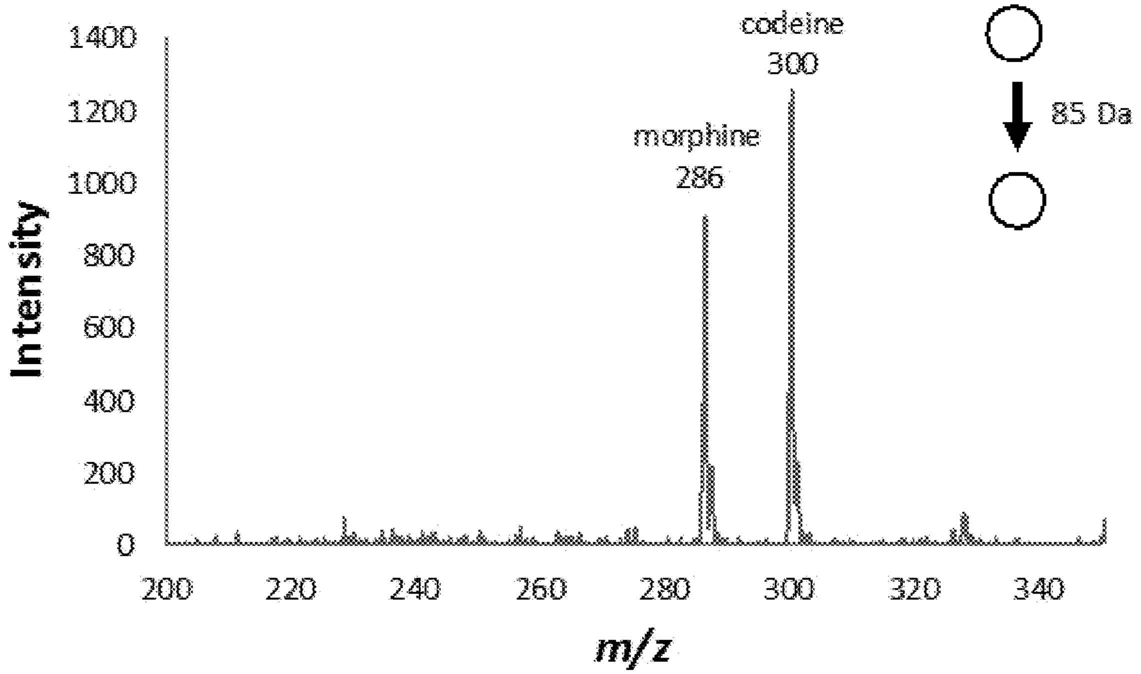
Figure 5D:
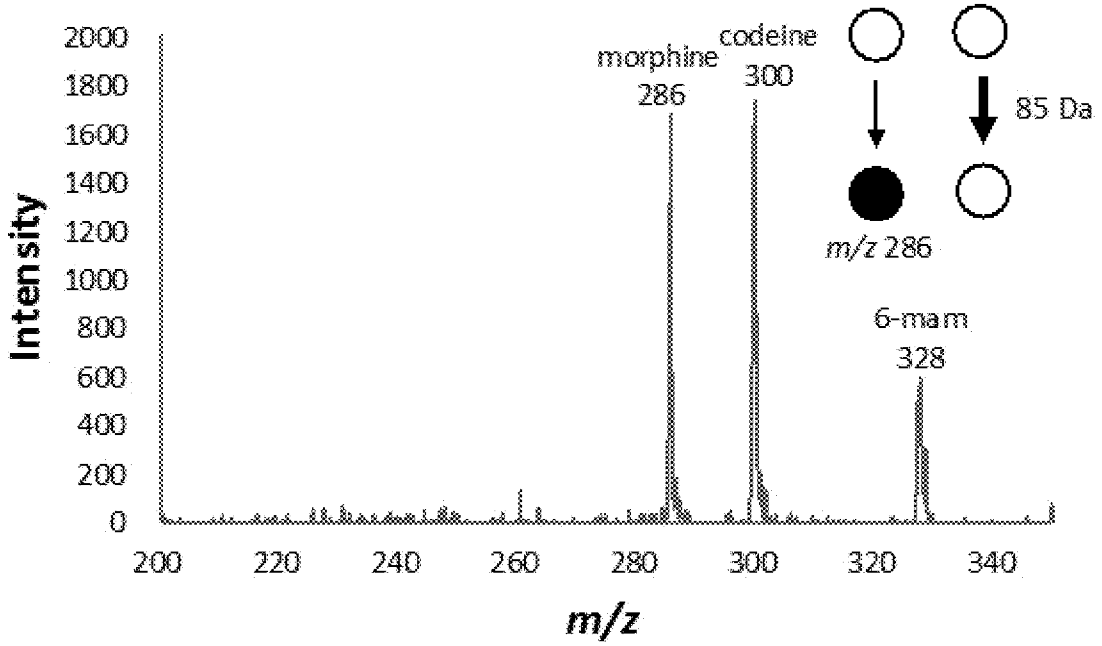
Figure 5E:
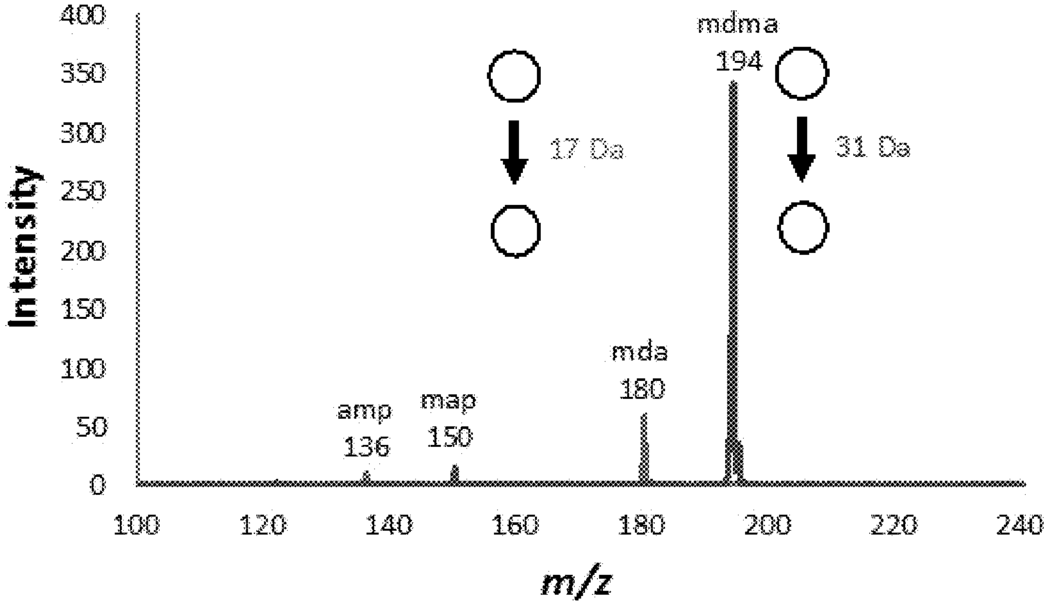
Figure 5F:
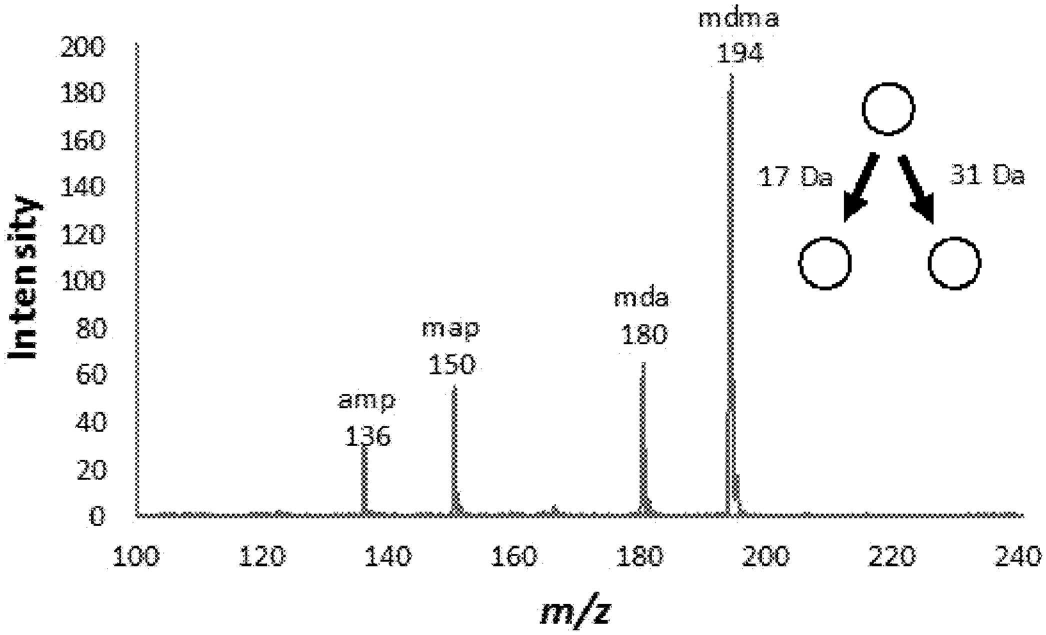

| MS/MS Permutation | Advantages over single stage MS/MS | Example | Experimental Scan Rate (Th/s) | Experimental LMCO (Th) |
|---|---|---|---|---|
| $Pre^n$ | Broad coverage of molecular functionality; increased coverage of a set of related analytes (e.g. amphetamines) | FIGS. 1A-B | 469 | 93 |
| $Pre^n$-NL | Coverage of several classes of compounds; increasing information yield from particularly uninformative MS/MS experiments (e.g. NL of water) | FIGS. 2A-B | 475 | 99 |
| $Pre^n$-$Pro^n$ | Extensive MS/MS domain mapping; confirmation of precursor ion identity, esp. isobars | FIGS. 3A-B | 226 | 85 |
| $NL^n$ (segmented) | Ability to work with several classes of compounds that generally lie in different m/z ranges | FIGS. 4A-B | 230, 415 | 91, 165 |
| Simultaneous $Pre^n$ | Broader analyte coverage in a single mass scan, although presentsmore ambiguity than discrete scans | FIG. 5B | 240 | 93 |
| Simultaneous $Pre^n$-NL | Broader analyte coverage in a single mass scan, although presents more ambiguity than discrete scans | FIG. 5D | 342 | 128 |
| Simultaneous $NL^n$ | Monitor multiple classes of compounds in a single scan, though there is ambiguity in precursor->product relationships | FIG. 5F | 214 | 83 |

Pre = precursor ion scan;
NL = neutral loss scan;
Pro = product ion scan
n = a positive integer
[a] Product ion scans can also be performed earlier in the sequence provided the masses of the fragments do not fall into ranges of interest in the other scan types
[b] Multiple reaction monitoring (MRM) experiments can also be done at the end of any permutation but they are not considered further as they are not scans.

Multiple precursor ion scans can be performed on the same ion population so long as the precursor ions are not ejected and fully fragmented. Precursor ion scans can also be followed by a single neutral loss scan. Because the neutral loss scan clears the ion trap with an 'artifact rejection' frequency sweep, no subsequent scans are possible using a single ion injection event. Any number of product ion scans can succeed precursor ion scans as well. Finally, although two neutral loss scans cannot interrogate the same mass range (for a single ion injection event), one can be used for a segmented neutral loss scan wherein different neutral loss scans are performed over different mass ranges. In each of the scans the AC amplitude is optimized while constant RF amplitude is used. presumably also at different RF amplitudes.

Multiple Precursor Ion Scans in Sequence

Multiple precursor ion scans are allowed because each precursor ion scan (at scan rates of hundreds of Daltons/charge per second) converts <10% of precursor ions to product ions. Permutations of precursor ion scans could be useful for scanning an analyte population for different molecular functionalities and for monitoring more than one class of molecules. An example of a double precursor ion scan is shown in FIGS. 1-B. In this example, amphetamines are monitored using a precursor ion scan of m/z 163 and cocaine is monitored using a precursor ion scan of m/z 182. All three amphetamines in this simple mixture could be detected at ~1 ppm with no artifact peaks and about 8% conversion of precursor ions to product ions at a scan rate of ~450 Da/s. The same precursor ion scan could, in principle, be performed multiple times, allowing for signal averaging or signal accumulation, somewhat mitigating the relatively low sensitivity of the method.

Precursor Ion Scans Followed by a Neutral Loss Scan

Precursor ion scans can be followed by a single neutral loss scan. Because the neutral loss scan clears the trap of ions, no other scans are subsequently possible. Nonetheless, like permutations of precursor ion scans, precursor ion scans followed by neutral loss scans may be useful for examining an ion population for different functional groups. FIGS. 2A-B show a precursor ion scan of m/z 182 (the most abundant product ion of cocaine) followed by a neutral loss scan of 18 Da, which targets opioids oxycodone and noroxycodone. In the case of the neutral loss scan, unit resolution is observed at a scan rate of 750 Da/s and at most 17% of the precursor ions are converted to detected product ions. In principle, multiple precursor ion scans could be followed by a single neutral loss scan.

Precursor Ion Scans Followed by Product Ion Scans

Product ion scans may follow precursor ion scans as well. A useful example of the utility of this scan mode is shown in FIGS. 3A-B, where isobaric buphedrone and N-ethylcathinone were detected, from a mixture with methamphetamine, using a precursor ion scan of m/z 160. A product ion scan of m/z 178 then confirms that both isobars are present since m/z 91 and 147 are unique to buphedrone and m/z 133 is unique to N-ethylcathinone. Note that no isolation was performed (and hence methamphetamine was also detected in the final mass scan), although in principle it would usually precede the product ion scan.

Segmented Neutral Loss Scans

Because neutral loss scans clear the precursor ions from the ion trap via the 'artifact rejection' frequency sweep, no other scan modes may follow them. So although neutral loss scans may not be repeated in the same mass range, segmented neutral loss scans are allowed. These are similar to segmented full mass scans wherein different mass ranges are interrogated at dissimilar RF amplitudes to improve resolution and mass accuracy. Neutral loss scans can also be 'segmented' so that different mass ranges can be analyzed for differing neutral losses. Segmenting the scan allows better mass spectral resolution to be obtained as well as better fragmentation efficiency for higher mass ions. Moreover, often different classes of molecules will occupy different mass ranges so that multiple classes of molecules could be monitored with a single ion injection event (e.g. fatty acids and complex phospholipids in tissue). FIGS. 4A-B show a segmented neutral loss scan of a mixture of methamphetamine, mdma, noroxycodone, and oxycodone. A first neutral loss scan of 31 Da was initiated at a low mass cutoff of ~90 Th, and a second neutral loss scan of 18 Da was carried out at a low mass cutoff of ~165 Th (i.e. using a higher rf amplitude). Both spectra exhibit unit resolution at a scan rate of 230 Da/s (first scan) and 415 Da/s (second scan) and at approximately 4% conversion of precursor ions to detected product ions.

Simultaneous Scans

One of the disadvantages of performing multiple discrete MS/MS scans in sequence is that insufficient ions may remain after the first scan for several reasons. It is possible that most of the precursor ions fragment in the first scan, or if enough collision energy is imparted to the precursors then they may collide with the orthogonal electrodes (y direction, in our case) and hence be lost before any other scans take place. In this case it is possible to perform simultaneous MS/MS scans. That is, one may perform multiple simultaneous precursor ion scans, or simultaneous precursor and neutral loss scans.

FIGS. 5A-D give examples of both cases. In FIG. 5A a full AC frequency scan of methamphetamine, mdma, and mdea is shown. Methamphetamine fragments to m/z 119 and the latter two frags fragment to m/z 163. Hence, all three amphetamines can be targeted (FIG. 5B) by doing a simultaneous precursor ion scan of both m/z values, which is accomplished by using a dual frequency waveform (332 kHz and 227 kHz) for product ion ejection. A simultaneous precursor and neutral loss scan can similarly be performed by applying the following waveforms simultaneously: 1) a frequency scan in y for precursor ion activation, 2) a fixed frequency sine wave in x for product ion ejection (precursor scan), 3) a frequency scan in y for precursor ion rejection (artifact rejection) after activation, and 4) a frequency scan in x, with fixed mass offset from the excitation frequency scan, for neutral loss product ion ejection into the detectors. FIG. 5C shows a single neutral loss scan of 85 Da on a simple solution of morphine (protonated analyte, m/z 286), codeine (protonated, m/z 300), and 6-monoacetylmorphine (6-mam, protonated, m/z 328), which detects the transitions m/z 286->201 and m/z 300->215. By simultaneously performing a precursor ion scan of m/z 286, 6-mam also appears in the MS/MS spectrum. Of course, whether each ion is ejected by the precursor scan or the neutral loss scan is ambiguous. Nonetheless, a simultaneous scan would still be useful, for example, in providing broad coverage of the amphetamines, which fragment either to m/z 163 or m/z 119. In this case it is not critical to know which fragment is produced by an unknown amphetamine, but a subsequent product ion scan would make the assignment clear.

Finally, an example of a simultaneous neutral loss scan performed on a mixture of amphetamine, methamphetamine, 3,4-methylenedioxyamphetamine, and 3,4-methylenedioxymethamphetamine is shown in FIG. 5F. The individual neutral loss scans (shown in FIG. 5E) are loss of 17 Da and loss of 31 Da (one ion injection each). Because each of these scans detects two of the amphetamines, all four of the amphetamines can be targeted by simultaneous neutral loss scans of 17 Da and 31 Da. This experiment required the following waveforms: 1) precursor ion excitation frequency sweep on the y electrodes, 2) artifact rejection sweep to eject unfragmented precursor ions into the y electrodes, 3) product ion ejection frequency sweep on the x electrodes for the 18 Da loss, and 4) product ion ejection frequency sweep on the x electrodes for the 31 Da loss.

Performance of MS/MS Scans on Oral Fluid

Figure 6A:
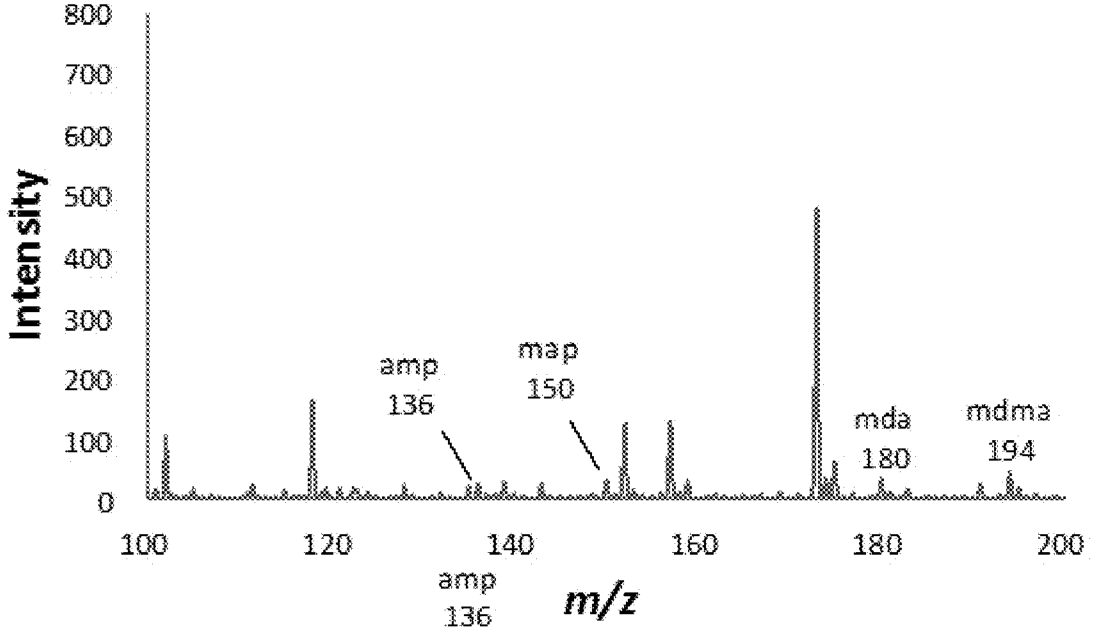
FIGS. 6A-C show simultaneous double precursor ion scan of oral fluid spiked with amphetamines.
Figure 6B:
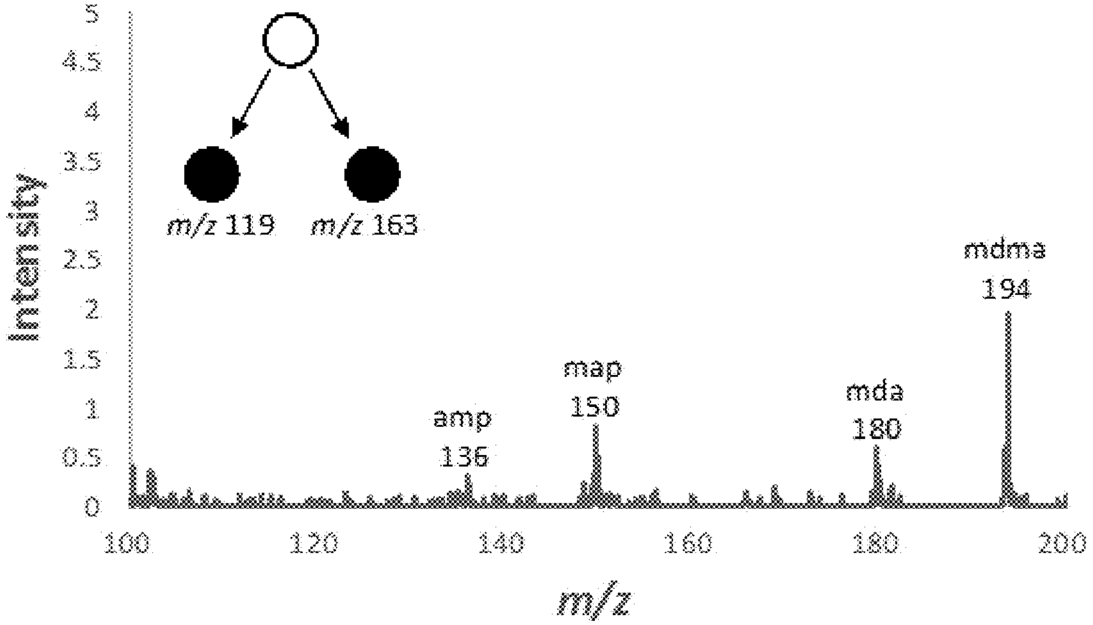
Figure 6C:
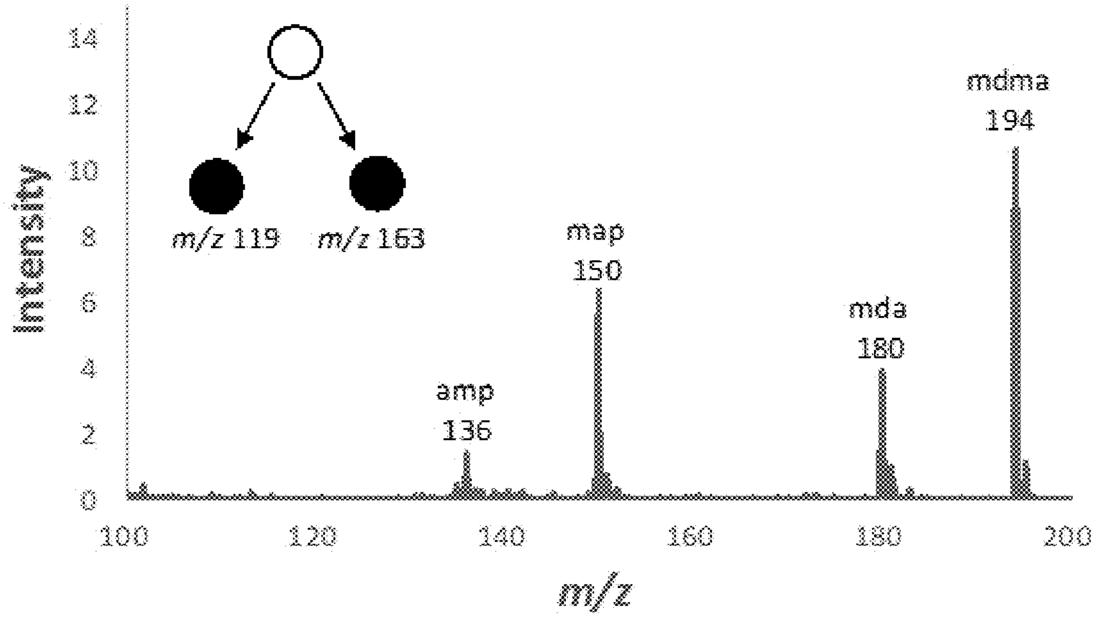

The final experiment performed in this work was translating the MS/MS scan modes to a complex mixture. Oral fluid was chosen as an appropriate sample, as it has previously been examined for illicit drugs by swab touch spray tandem mass spectrometry.58 In this work amphetamine standards were spiked into the oral fluid at concentrations ranging from 1 ppm to 100 ppm and subsequently it was diluted ten-fold in 50:4.9:0.1 acetonitrile:water:formic acid to improve nanospray performance. A full scan of the nanosprayed solution of 100 ppb (final concentration, 1 ppm in oral fluid) is shown in FIG. 6A. The four amphetamine peaks are buried in the mass spectrum. A simultaneous double precursor ion scan, FIG. 6B, of m/z 119 and m/z 163 reveals all four amphetamines, although clearly the scan was performed near the limit of detection. The same scan with 10× high concentration is shown in FIG. 6C. Both spectra are remarkably clean and free from artifacts.

Inverse Mathieu q scan

An inverse Mathieu q scan is described in U.S. application Ser. No. 15/789,688, the content of which is incorporated by reference herein in its entirety. An inverse Mathieu q scan operates using a method of secular frequency scanning in which mass-to-charge is linear with time. This approach contrasts with linear frequency sweeping that requires a complex nonlinear mass calibration procedure. In the current approach, mass scans are forced to be linear with time by scanning the frequency of a supplementary alternating current (supplementary AC) so that there is an inverse relationship between an ejected ion's Mathieu q parameter and time. Excellent mass spectral linearity is observed using the inverse Mathieu q scan. The rf amplitude is shown to control both the scan range and the scan rate, whereas the AC amplitude and scan rate influence the mass resolution. The scan rate depends linearly on the rf amplitude, a unique feature of this scan. Although changes in either rf or AC amplitude affect the positions of peaks in time, they do not change the mass calibration procedure since this only requires a simple linear fit of m/z vs time. The inverse Mathieu q scan offers a significant increase in mass range and power savings while maintaining access to linearity, paving the way for a mass spectrometer based completely on AC waveforms for ion isolation, ion activation, and ion ejection.

Methods of scanning ions out of quadrupole ion traps for external detection are generally derived from the Mathieu parameters $a_u$ and $q_u$, which describe the stability of ions in quadrupolar fields with dimensions u. For the linear ion trap with quadrupole potentials in x and y, $$q_x=-q_y=8zeV_{0-p}/\Omega^2(x_0^2+y_0^2)m \quad (1)$$

$$a_x=-a_y=16zeU/\Omega^2(x_0^2+y_0^2)m \quad (2)$$

re z is the integer charge of the ion, e is the elementary charge, U is the DC potential between the rods, $V_{0-p}$ is the zero-to-peak amplitude of the quadrupolar radiofrequency (rf) trapping potential, Ω is the angular rf frequency, $x_0$ and $y_0$ are the half distances between the rods in those respective dimensions, and m is the mass of the ion. When the dimensions in x and y are identical ($x_0=y_0$), $2r_0^2$ can be substituted for ($x_0^2+y_0^2$). Solving for m/z, the following is obtained:

$$m/z=4V_{0-p}/q_x\Omega^2r_0^2 \quad (3)$$

$$m/z=8U/a_x\Omega^2r_0^2 \quad (4)$$

Ion traps are generally operated without DC potentials ($a_u$=U=0) so that all ions occupy the q axis of the Mathieu stability diagram. In the boundary ejection method, first demonstrated in the 3D trap and in the linear ion trap, the rf amplitude is increased so that ions are ejected when their trajectories become unstable at q=0.908, giving a mass spectrum, i.e. a plot of intensity vs m/z since m/z and rf amplitude (i.e. time) are linearly related.

The basis for an inverse Mathieu q scan is derived from the nature of the Mathieu parameter $q_u$ (eq. 3). In order to scan linearly with m/z at constant rf frequency and amplitude, the $q_u$ value of the m/z value being excited should be scanned inversely with time t so that $$q_u=k/(t-j) \quad (5)$$

where k and j are constants determined from the scan parameters. In the mode of operation demonstrated here, the maximum and minimum $q_u$ values ($q_{max}$ and $q_{min}$), which determine the m/z range in the scan, are specified by the user. Because the inverse function does not intersect the q axis (e.g. $q_u$=1/t), the parameter j is used for translation so that the first q value is $q_{max}$. This assumes a scan from high q to low q, which will tend to give better resolution and sensitivity due to the ion frequency shifts mentioned above.

The parameters j and k are calculated from the scan parameters, $$j=q_{min}\Delta t/(q_{min}-q_{max}) \quad (6)$$

$$k=-q_{max}j \quad (7)$$

where Δt is the scan time. Operation in Mathieu q space gives advantages: 1) the waveform frequencies depend only on the rf frequency, not on the rf amplitude or the size or geometry of the device, which implies that the waveform only has to be recalculated if the rf frequency changes (alternatively, the rf amplitude can compensate for any drift in rf frequency), and 2) the mass range and scan rate are controlled by the rf amplitude, mitigating the need for recalculating the waveform in order to change either parameter. It is important to note that we purposely begin with an array of $q_u$ values instead of m/z values for these very reasons.

Once an array of Mathieu $q_u$ values is chosen, they are converted to secular frequencies, which proceeds first through the calculation of the Mathieu $\beta_u$ parameter, $$\beta_u^2 = a_u + \cfrac{q_u^2}{(\beta_u+2)^2 - a_u - \cfrac{q_u^2}{(\beta_u+4)^2 - a_u - \cfrac{q_u^2}{(\beta_u+6)^2 - a_u - \ldots}}} + \cfrac{q_u^2}{(\beta_u-2)^2 - a_u - \cfrac{q_u^2}{(\beta_u-4)^2 - a_u - \cfrac{q_u^2}{(\beta_u-6)^2 - a_u - \ldots}}} \quad (8)$$

a conversion that can be done by using the algorithm described in Snyder et al. (Rapid Commun. Mass Spectrom. 2016, 30, 1190), the content of which is incorporated by reference herein in its entirety. The final step is to convert Mathieu $\beta_u$ values to secular frequencies (eqns. 9, 10) to give applied AC frequency vs time. Each ion has a set of secular frequencies, $$\omega_{u,n}=|2n+\beta_u|\Omega/2 \quad -\infty<n<\infty \quad (9)$$

where n is an integer, amongst which is the primary resonance frequency, the fundamental secular frequency, $$\omega_{u,0}=\beta_u\Omega/2 \quad (10)$$

This conversion gives an array of frequencies for implementation into a custom waveform calculated in a mathematics suite (e.g. Matlab).

Prior work used a logarithmic sweep of the AC frequency for secular frequency scanning, but, as described here, the relationship between secular frequency and m/z is not logarithmic, resulting in very high mass errors during mass calibration.

In theory, once the Mathieu $q_u$ parameters are converted to secular frequencies, a waveform is obtained. However, this waveform should not be used for secular frequency scanning due to the jagged edges observed throughout the waveform (i.e. phase discontinuities). In the mass spectra, this is observed as periodic spikes in the baseline intensities. Instead, in order to perform a smooth frequency scan, a new parameter Φ is introduced. This corresponds to the phase of the sinusoid at every time step (e.g. the $i^{th}$ phase in the waveform array, where i is an integer from 0 to v*Δt−1). Instead of scanning the frequency of the waveform, the phase of the sinusoid is instead scanned in order to maintain a continuous phase relationship. The relationship between ordinary (i.e. not angular) frequency f and phase Φ is:

$$f(t)=(1/2\pi)(d\Phi/dt)(t) \quad (11)$$

so that $$\Phi(t)=\Phi(0)+2\pi\int_0 f(\tau)d\tau \quad (12)$$

where variable τ has been substituted for time tin order to prevent confusion between the integration limit t and the time variable in the integrand. Thus, the phase of the sine wave at a given time t can be obtained by integrating the function that describes the frequency of the waveform as a function of time, which was previously calculated.

We begin with the phase of the waveform set equal to zero:

$$\Phi(0)=0(t=0) \quad (13)$$

The phase is then incremented according to eqns. 14 and 15, which accumulates (integrates) the frequency of the sinusoid, so that $$\Delta=\omega_{u,0}/v \quad (14)$$

$$\Phi(i+1)=\Phi(i)+\Delta \quad (15)$$

where v is the sampling rate of the waveform generator. Note that $\omega_{u,0}$ is the angular secular frequency ($2*\pi*f_{u,0}$, where $f_{u,0}$ is the ordinary secular frequency in Hz) in units of radians/sec. Thus, sweeping through phase Φ (FIG. 1D) instead of frequency gives a smooth frequency sweep.

Because the relationship between secular frequency and time is approximately an inverse function, the phase will be swept according to the integral of an inverse function, which is a logarithmic function. However, because the relationship between secular frequency and m/z is only approximately an inverse relationship, the phase 1 will deviate from the log function and thus cannot be described analytically (due to eq. 8).

Ion Traps and Mass Spectrometers

Any ion trap known in the art can be used in systems of the invention. Exemplary ion traps include a hyperbolic ion trap (e.g., U.S. Pat. No. 5,644,131, the content of which is incorporated by reference herein in its entirety), a cylindrical ion trap (e.g., Bonner et al., International Journal of Mass Spectrometry and Ion Physics, 24(3):255-269, 1977, the content of which is incorporated by reference herein in its entirety), a linear ion trap (Hagar, Rapid Communications in Mass Spectrometry, 16(6):512-526, 2002, the content of which is incorporated by reference herein in its entirety), and a rectilinear ion trap (U.S. Pat. No. 6,838,666, the content of which is incorporated by reference herein in its entirety).

Any mass spectrometer (e.g., bench-top mass spectrometer of miniature mass spectrometer) may be used in systems of the invention and in certain embodiments the mass spectrometer is a miniature mass spectrometer. An exemplary miniature mass spectrometer is described, for example in Gao et al. (Anal. Chem. 2008, 80, 7198-7205.), the content of which is incorporated by reference herein in its entirety. In comparison with the pumping system used for lab-scale instruments with thousands of watts of power, miniature mass spectrometers generally have smaller pumping systems, such as a 18 W pumping system with only a 5 L/min (0.3 $m^3$/hr) diaphragm pump and a 11 L/s turbo pump for the system described in Gao et al. Other exemplary miniature mass spectrometers are described for example in Gao et al. (Anal. Chem., 2008, 80, 7198-7205.), Hou et al. (Anal. Chem., 2011, 83, 1857-1861.), and Sokol et al. (Int. J. Mass Spectrom., 2011, 306, 187-195), the content of each of which is incorporated herein by reference in its entirety.

Figure 7:
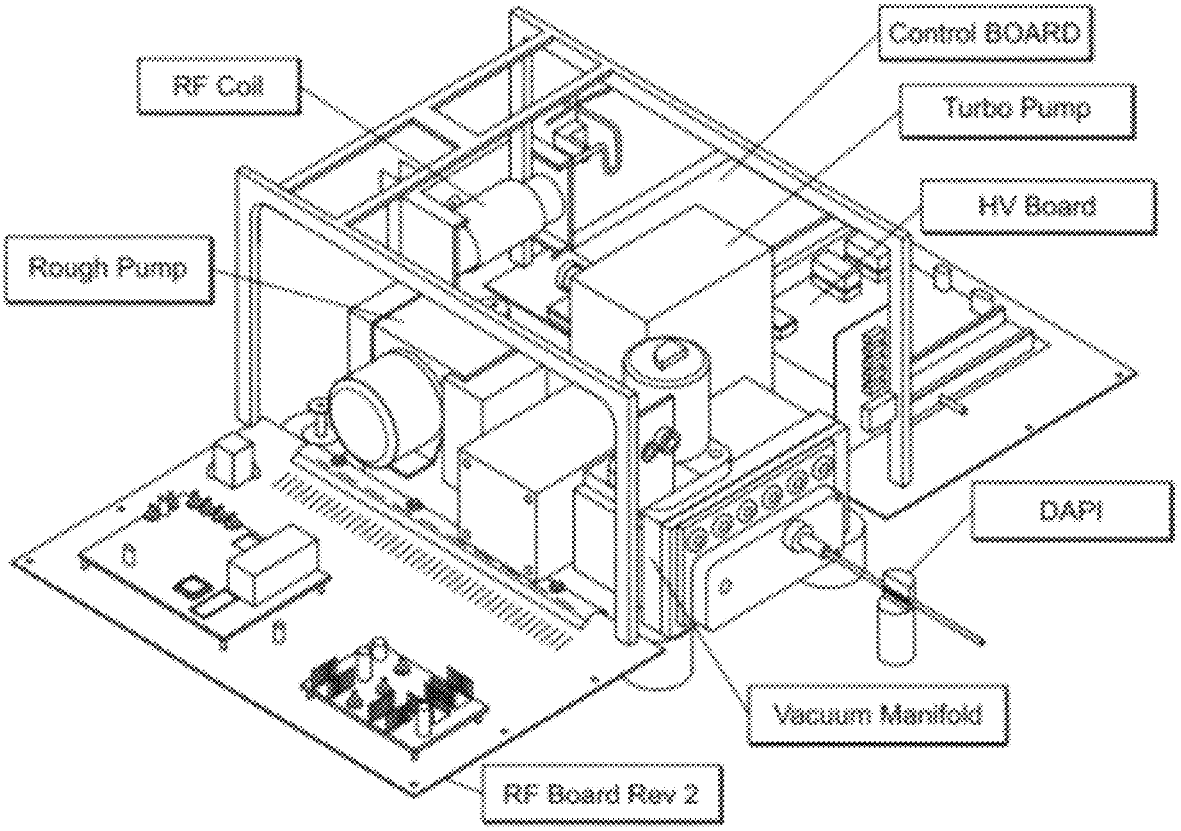
FIG. 7 is a picture illustrating various components and their arrangement in a miniature mass spectrometer.

FIG. 7 is a picture illustrating various components and their arrangement in a miniature mass spectrometer. The control system of the Mini 12 (Linfan Li, Tsung-Chi Chen, Yue Ren, Paul I. Hendricks, R. Graham Cooks and Zheng Ouyang "Miniature Ambient Mass Analysis System" Anal. Chem. 2014, 86 2909-2916, DOI: 10.1021/ac403766c; and 860. Paul I. Hendricks, Jon K. Dalgleish, Jacob T. Shelley, Matthew A. Kirleis, Matthew T. McNicholas, Linfan Li, Tsung-Chi Chen, Chien-Hsun Chen, Jason S. Duncan, Frank Boudreau, Robert J. Noll, John P. Denton, Timothy A. Roach, Zheng Ouyang, and R. Graham Cooks "Autonomous in-situ analysis and real-time chemical detection using a backpack miniature mass spectrometer: concept, instrumentation development, and performance" Anal. Chem., 2014, 86 2900-2908 DOI: 10.1021/ac403765x, the content of each of which is incorporated by reference herein in its entirety), and the vacuum system of the Mini 10 (Liang Gao, Qingyu Song, Garth E. Patterson, R. Graham Cooks and Zheng Ouyang, "Handheld Rectilinear Ion Trap Mass Spectrometer", Anal. Chem., 78 (2006) 5994-6002 DOI: 10.1021/ac061144k, the content of which is incorporated by reference herein in its entirety) may be combined to produce the miniature mass spectrometer shown in FIG. 7. It may have a size similar to that of a shoebox (H20×W25 cm×D35 cm). In certain embodiments, the miniature mass spectrometer uses a dual LIT configuration, which is described for example in Owen et al. (U.S. patent application Ser. No. 14/345,672), and Ouyang et al. (U.S. patent application Ser. No. 61/865,377), the content of each of which is incorporated by reference herein in its entirety.

Ionization Sources

In certain embodiments, the systems of the invention include an ionizing source, which can be any type of ionizing source known in the art. Exemplary mass spectrometry techniques that utilize ionization sources at atmospheric pressure for mass spectrometry include paper spray ionization (ionization using wetted porous material, Ouyang et al., U.S. patent application publication number 2012/0119079), electrospray ionization (ESI; Fenn et al., Science, 1989, 246, 64-71; and Yamashita et al., J. Phys. Chem., 1984, 88, 4451-4459.); atmospheric pressure ionization (APCI; Carroll et al., Anal. Chem. 1975, 47, 2369-2373); and atmospheric pressure matrix assisted laser desorption ionization (AP-MALDI; Laiko et al. Anal. Chem., 2000, 72, 652-657; and Tanaka et al. Rapid Commun. Mass Spectrom., 1988, 2, 151-153,). The content of each of these references is incorporated by reference herein in its entirety.

Exemplary mass spectrometry techniques that utilize direct ambient ionization/sampling methods include desorption electrospray ionization (DESI; Takats et al., Science, 2004, 306, 471-473, and U.S. Pat. No. 7,335,897); direct analysis in real time (DART; Cody et al., Anal. Chem., 2005, 77, 2297-2302.); atmospheric pressure dielectric barrier discharge Ionization (DBDI; Kogelschatz, Plasma Chemistry and Plasma Processing, 2003, 23, 1-46, and PCT international publication number WO 2009/102766), and electrospray-assisted laser desorption/ionization (ELDI; Shiea et al., J. Rapid Communications in Mass Spectrometry, 2005, 19, 3701-3704.). The content of each of these references in incorporated by reference herein its entirety.

System Architecture

Figure 8:
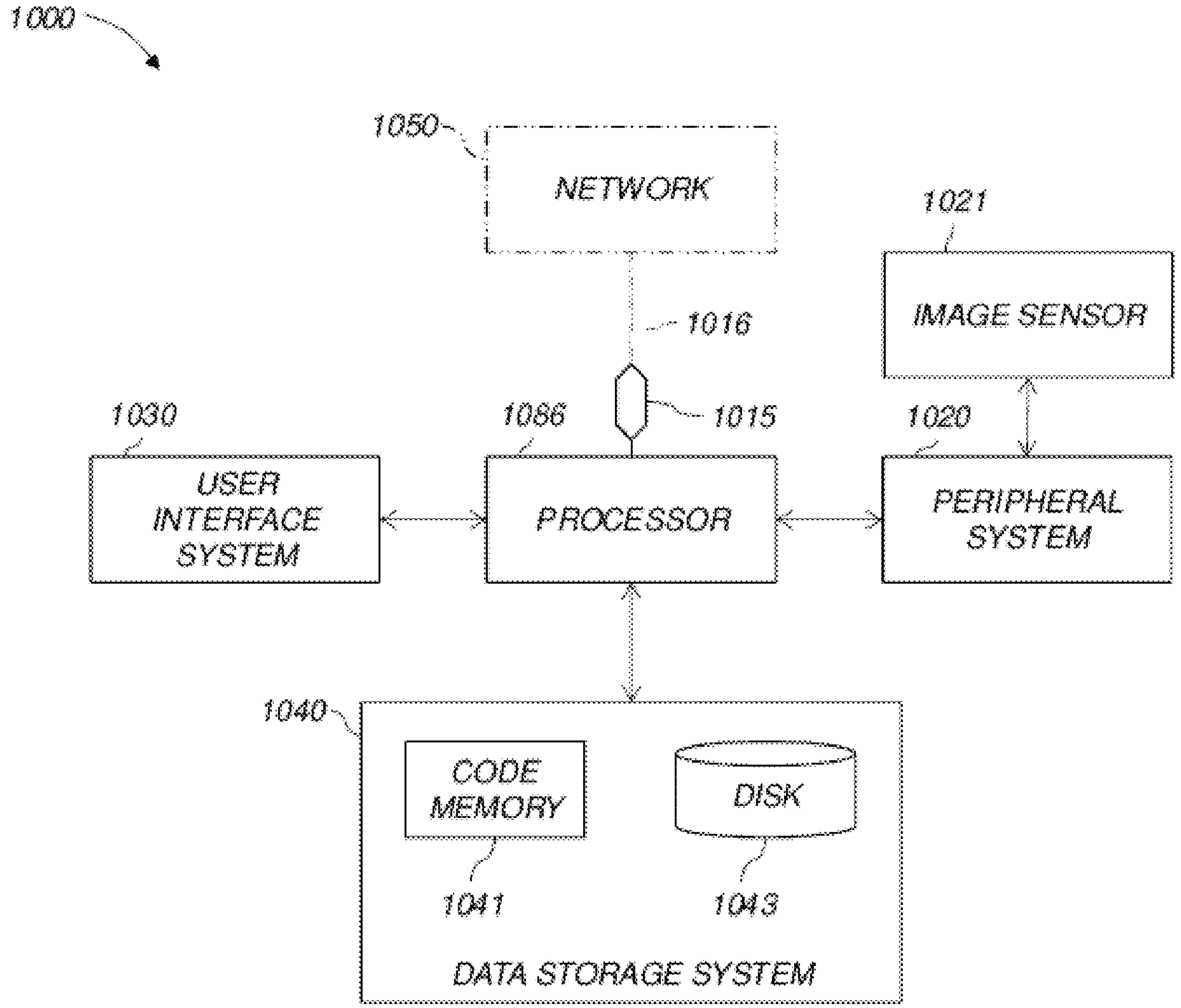
FIG. 8 shows a high-level diagram of the components of an exemplary data-processing system for analyzing data and performing other analyses described herein, and related components.

FIG. 8 is a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The data described above may be obtained using detector 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 which in one embodiment may be capable of real-time calculations (and in an alternative embodiment configured to perform calculations on a non-real-time basis and store the results of calculations for use later) can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the at a processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (e.g., a tablet) connected, e.g., via a network or a null-modem cable, or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), Universal Serial Bus (USB) interface memory device, erasable programmable read-only memories (EPROM, EEPROM, or Flash), remotely accessible hard drives, and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors) to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Discontinuous Atmospheric Pressure Interface (DAPI)

In certain embodiments, the systems of the invention can be operated with a Discontinuous Atmospheric Pressure Interface (DAPI). A DAPI is particularly useful when coupled to a miniature mass spectrometer, but can also be used with a standard bench-top mass spectrometer. Discontinuous atmospheric interfaces are described in Ouyang et al. (U.S. Pat. No. 8,304,718 and PCT application number PCT/US2008/065245), the content of each of which is incorporated by reference herein in its entirety.

Samples

A wide range of heterogeneous samples can be analyzed, such as biological samples, environmental samples (including, e.g., industrial samples and agricultural samples), and food/beverage product samples, etc.

Exemplary environmental samples include, but are not limited to, groundwater, surface water, saturated soil water, unsaturated soil water; industrialized processes such as waste water, cooling water; chemicals used in a process, chemical reactions in an industrial processes, and other systems that would involve leachate from waste sites; waste and water injection processes; liquids in or leak detection around storage tanks; discharge water from industrial facilities, water treatment plants or facilities; drainage and leachates from agricultural lands, drainage from urban land uses such as surface, subsurface, and sewer systems; waters from waste treatment technologies; and drainage from mineral extraction or other processes that extract natural resources such as oil production and in situ energy production.

Additionally exemplary environmental samples include, but certainly are not limited to, agricultural samples such as crop samples, such as grain and forage products, such as soybeans, wheat, and corn. Often, data on the constituents of the products, such as moisture, protein, oil, starch, amino acids, extractable starch, density, test weight, digestibility, cell wall content, and any other constituents or properties that are of commercial value is desired.

Exemplary biological samples include a human tissue or bodily fluid and may be collected in any clinically acceptable manner. A tissue is a mass of connected cells and/or extracellular matrix material, e.g. skin tissue, hair, nails, nasal passage tissue, CNS tissue, neural tissue, eye tissue, liver tissue, kidney tissue, placental tissue, mammary gland tissue, placental tissue, mammary gland tissue, gastrointestinal tissue, musculoskeletal tissue, genitourinary tissue, bone marrow, and the like, derived from, for example, a human or other mammal and includes the connecting material and the liquid material in association with the cells and/or tissues. A body fluid is a liquid material derived from, for example, a human or other mammal.

Such body fluids include, but are not limited to, mucous, blood, plasma, serum, serum derivatives, bile, blood, maternal blood, phlegm, saliva, sputum, sweat, amniotic fluid, menstrual fluid, mammary fluid, peritoneal fluid, urine, semen, and cerebrospinal fluid (CSF), such as lumbar or ventricular CSF. A sample may also be a fine needle aspirate or biopsied tissue. A sample also may be media containing cells or biological material. A sample may also be a blood clot, for example, a blood clot that has been obtained from whole blood after the serum has been removed.

In one embodiment, the biological sample can be a blood sample, from which plasma or serum can be extracted. The blood can be obtained by standard phlebotomy procedures and then separated. Typical separation methods for preparing a plasma sample include centrifugation of the blood sample. For example, immediately following blood draw, protease inhibitors and/or anticoagulants can be added to the blood sample. The tube is then cooled and centrifuged, and can subsequently be placed on ice. The resultant sample is separated into the following components: a clear solution of blood plasma in the upper phase; the buffy coat, which is a thin layer of leukocytes mixed with platelets; and erythrocytes (red blood cells). Typically, 8.5 mL of whole blood will yield about 2.5-3.0 mL of plasma.

Blood serum is prepared in a very similar fashion. Venous blood is collected, followed by mixing of protease inhibitors and coagulant with the blood by inversion. The blood is allowed to clot by standing tubes vertically at room temperature. The blood is then centrifuged, wherein the resultant supernatant is the designated serum. The serum sample should subsequently be placed on ice.

Prior to analyzing a sample, the sample may be purified, for example, using filtration or centrifugation. These techniques can be used, for example, to remove particulates and chemical interference. Various filtration media for removal of particles includes filer paper, such as cellulose and membrane filters, such as regenerated cellulose, cellulose acetate, nylon, PTFE, polypropylene, polyester, polyethersulfone, polycarbonate, and polyvinylpyrolidone. Various filtration media for removal of particulates and matrix interferences includes functionalized membranes, such as ion exchange membranes and affinity membranes; SPE cartridges such as silica- and polymer-based cartridges; and SPE (solid phase extraction) disks, such as PTFE- and fiberglass-based. Some of these filters can be provided in a disk format for loosely placing in filter holdings/housings, others are provided within a disposable tip that can be placed on, for example, standard blood collection tubes, and still others are provided in the form of an array with wells for receiving pipetted samples. Another type of filter includes spin filters. Spin filters consist of polypropylene centrifuge tubes with cellulose acetate filter membranes and are used in conjunction with centrifugation to remove particulates from samples, such as serum and plasma samples, typically diluted in aqueous buffers.

Filtration is affected in part, by porosity values, such that larger porosities filter out only the larger particulates and smaller porosities filtering out both smaller and larger porosities. Typical porosity values for sample filtration are the 0.20 and 0.45 μm porosities. Samples containing colloidal material or a large amount of fine particulates, considerable pressure may be required to force the liquid sample through the filter. Accordingly, for samples such as soil extracts or wastewater, a pre-filter or depth filter bed (e.g. "2-in-1" filter) can be used and which is placed on top of the membrane to prevent plugging with samples containing these types of particulates.

In some cases, centrifugation without filters can be used to remove particulates, as is often done with urine samples. For example, the samples are centrifuged. The resultant supernatant is then removed and frozen.

After a sample has been obtained and purified, the sample can be analyzed to determine the concentration of one or more target analytes, such as elements within a blood plasma sample. With respect to the analysis of a blood plasma sample, there are many elements present in the plasma, such as proteins (e.g., Albumin), ions and metals (e.g., iron), vitamins, hormones, and other elements (e.g., bilirubin and uric acid). Any of these elements may be detected using methods of the invention. More particularly, methods of the invention can be used to detect molecules in a biological sample that are indicative of a disease state.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system comprising:

a mass spectrometer comprising a single ion trap; and a central processing unit (CPU), and storage coupled to the CPU for storing instructions that when executed by the CPU cause the system to apply at least one of the following ion scans to a single ion population in the single ion trap and prior to an ejection event: multiple precursor ion scans, a plurality of segmented neutral loss scans, or multiple simultaneous neutral loss scans.

2. The system according to claim 1, wherein the multiple precursor ion scans are applied sequentially to the single ion population.

3. The system according to claim 1, wherein the multiple precursor ion scans are applied simultaneously to the single ion population.

4. The system according to claim 1, wherein the ion scans are multiple precursor ion scans, and the CPU is configured to cause the system to apply at least one additional scan to the single ion trap.

5. The system according to claim 4, wherein the at least one additional scan is a neutral loss scan.

6. The system according to claim 5, wherein the CPU causes the system to apply the neutral loss scan simultaneously with the multiple precursor ion scans.

7. The system according to claim 5, wherein the CPU causes the system to apply the neutral loss scan sequentially with the multiple precursor ion scans.

8. The system according to claim 4, wherein the at least one additional scan is one or more product ion scans, wherein the CPU is configured to perform the at least one additional scan after the CPU performs the multiple precursor ion scans.

9. A method for analyzing a single ion population, the method comprising;

generating a single ion population that is transferred into a single ion trap of a mass spectrometer; and applying, via a CPU operably associated with the mass spectrometer, at least one of the following ion scans to the single ion population in the single ion trap and prior to an ejection event: multiple precursor ion scans, a plurality of segmented neutral loss scans, or multiple simultaneous neutral loss scans.

10. The method according to claim 9, wherein the multiple precursor ion scans are applied sequentially to the single ion population.

11. The method according to claim 9, wherein the multiple precursor ion scans are applied simultaneously to the single ion population.

12. The method according to claim 9, wherein the ion scans are multiple precursor ion scans and the method further comprises applying, via the CPU operably associated with the mass spectrometer, at least one additional scan to the single ion trap.

13. The method according to claim 12, wherein the at least one additional scan is a neutral loss scan.

14. The method according to claim 13, wherein the neutral loss scan is applied simultaneously with the multiple precursor ion scans.

15. The method according to claim 13, wherein the neutral loss scan is applied sequentially with the multiple precursor ion scans.

16. The method according to claim 12, wherein the at least one additional scan is one or more product ion scans, which are performed after the multiple precursor ion scans.

17. The method according to claim 12, wherein the at least one additional scan is a product ion scan.

18. The method according to claim 12, wherein the at least one additional scan is a plurality of segmented neutral loss scans.

19. A method for analyzing a sample, the method comprising;

generating a single ion population from a sample that is transferred into a single ion trap of a mass spectrometer; and applying, via a CPU operably associated with the mass spectrometer, at least one of the following ion scans to the single ion population in the single ion trap and prior to an ejection event: multiple precursor ion scans, a plurality of segmented neutral loss scans, or multiple simultaneous neutral loss scans, thereby analyzing the sample.

20. The method according to claim 19, wherein the sample is selected from the group consisting of: a biological sample, an agricultural sample, an industrial sample, an environmental sample, and a combination thereof.

* * * * *